(12) United States Patent
Champagne et al.

(10) Patent No.: US 7,188,160 B2
(45) Date of Patent: Mar. 6, 2007

(54) METHOD AND APPARATUS FOR UPDATING NETWORK DEVICE CONFIGURATION INFORMATION IN A NETWORK MANAGEMENT SYSTEM

(75) Inventors: Yves-Andre Champagne, Medford, MA (US); Joan E. Luciani, Acton, MA (US); Stella I. Ko, Acton, MA (US); Paul F. Langille, Temple, NH (US); Edward F. McKenna, York, ME (US)

(73) Assignee: Ericsson AB, Stockholm (SE)

( * ) Notice: Subject to any disclaimer, the term of this patent is extended or adjusted under 35 U.S.C. 154(b) by 709 days.

(21) Appl. No.: 10/054,670

(22) Filed: Jan. 22, 2002

(65) Prior Publication Data

US 2003/0140132 A1    Jul. 24, 2003

(51) Int. Cl.
*G06F 15/177* (2006.01)
(52) U.S. Cl. .................. 709/220; 709/221; 709/222; 709/223
(58) Field of Classification Search ................. 709/220
See application file for complete search history.

(56) References Cited

U.S. PATENT DOCUMENTS 6,259,679 B1 * 7/2001 Henderson et al. ......... 370/254
6,480,955 B1 * 11/2002 DeKoning et al. .......... 713/100
2002/0069272 A1 * 6/2002 Kim et al. .................. 709/221
2003/0018755 A1 * 1/2003 Masterson et al. .......... 709/220
2003/0028624 A1 * 2/2003 Hasan et al. ................ 709/220
2003/0105838 A1 * 6/2003 Presley ....................... 709/220

OTHER PUBLICATIONS

Bray et al., "Extensible Markup Language (XML) 1.0 (Second Edition)", http://www.w3.org/TR/2000/REC-xml-20001006, pp. 1-67, (2000).

* cited by examiner

*Primary Examiner*—Ropal Dharia
*Assistant Examiner*—Nicholas R. Taylor
(74) *Attorney, Agent, or Firm*—Ansel M. Schwartz

(57) ABSTRACT

A managed network device maintains running configuration information, and changes the information in response to configuration change requests from a network management system (NMS) at a first interface and configuration change requests received from outside the NMS at a second interface, which may include a command line interface and dial-up connection such as TELNET. Configuration information for the device is maintained in a database in the NMS, and can become outdated due to the configuration change requests received at the second interface. To update the information in the NMS database, the NMS sends an upload configuration request to the network device, which responds by transferring a configuration file containing the running configuration information to the NMS. The NMS uses the contents of the uploaded configuration file to update the information in the NMS database.

38 Claims, 2 Drawing Sheets

METHOD AND APPARATUS FOR UPDATING NETWORK DEVICE CONFIGURATION INFORMATION IN A NETWORK MANAGEMENT SYSTEM

CROSS REFERENCE TO RELATED APPLICATIONS

None

STATEMENT REGARDING FEDERALLY SPONSORED RESEARCH OR DEVELOPMENT

Not Applicable

BACKGROUND OF THE INVENTION

The present invention relates to the field of network management in data communications networks.

Network management systems are used to monitor and control the operational behavior of data communications networks and the individual devices included in such networks. Operational characteristics of networks and devices can be monitored to obtain information useful to a network management user such as a network administrator. Such characteristics can include, for example, the manner in which various devices are connected to each other, the capacities and relative utilization of communications links among the devices, the extent and locations of faults or problems in the network such as traffic congestion and packet loss, etc. On the control side, network management systems are utilized to configure the network devices in accordance with a plan of network operation, for example by defining virtual circuits used to carry traffic between devices, and establishing forwarding tables and filtering rules that are used in routing and selective filtering of traffic.

For network management systems to be effective, it is important that they contain accurate information regarding the operational state of the managed devices. Information can be maintained in the network management system based on explicit monitoring of the devices, or based on a combination of monitoring and inferences drawn from control operations. That is, if the network management system is used to configure a network device, the network management can infer that the device's operational configuration is that which would normally result from the stream of configuration commands sent to the device from the network management system. By such operation, the amount of explicit monitoring or polling of a network device to obtain configuration information can be reduced. However, there may be circumstances under which it is desirable to explicitly obtain configuration information from a managed device in order to ensure that device information in the network management system is accurate. Therefore, there is a need for efficient and robust mechanisms by which such information transfers can be accomplished.

BRIEF SUMMARY OF THE INVENTION

In accordance with the present invention, a method and apparatus are disclosed for updating network device information in a network management system so that the information in the network management system becomes synchronized to configuration information maintained at the network device. The method can be performed upon command of a network management user and upon certain events, such as power-up of the device, so that potential problems associated with unsynchronized operation are reduced or avoided. The method is particularly useful with network devices whose configuration can be changed in some way other than via the network management system. In such a case, it is possible that configuration changes are made that the network management system is unaware of, and therefore an explicit transfer of information is needed to ensure that the configuration information maintained by the network management system is accurate.

The network device maintains running configuration information and changes the running configuration information in response to configuration change requests received from the network management system at a first interface. The network device also changes the running configuration information in response to configuration change requests received from outside the network management system at a second interface. The second interface may include a command line interface and associated connection such as a dial-up connection, Internet connection, etc. The network management system maintains a database including configuration information for the network device. The configuration information in this database has the potential to become outdated due to the configuration change requests received by the network device at the second interface. Thus, under predetermined conditions, a "synchronization" process is executed. The network management system sends an upload configuration request to the network device, to which the network device responds by transferring a configuration file containing the running configuration information to the network management system. Upon receiving the configuration file from the network device, the network management system updates the configuration information in the database using the contents of the configuration file. By this mechanism, the configuration information in the network management system database is kept synchronized to the running configuration information of the network device.

In the disclosed system, the synchronization process can be initiated by a network management client in response to input from a user. The network management client sends a synchronization request message to a network management server that maintains the database and exchanges messages with the network device to effect the uploading of the configuration file. The process can also be initiated via a trap message sent by the network device to the network management server under certain conditions, such as upon power-up or upon insertion or removal of a circuit card.

The configuration file may incorporate extensibility for relative ease in upgrading the network device independently of the network management system. In one embodiment, the configuration file employs the Extensible Markup Language (XML) and a Document Type Definition (DTD) that defines the structure of the XML configuration file.

Other aspects, features, and advantages of the present invention will be apparent from the detailed description that follows.

BRIEF DESCRIPTION OF THE SEVERAL VIEWS OF THE DRAWING

The invention will be more fully understood by reference to the following Detailed Description of the invention in conjunction with the Drawing, of which.

DETAILED DESCRIPTION OF THE INVENTION

Figure 1:
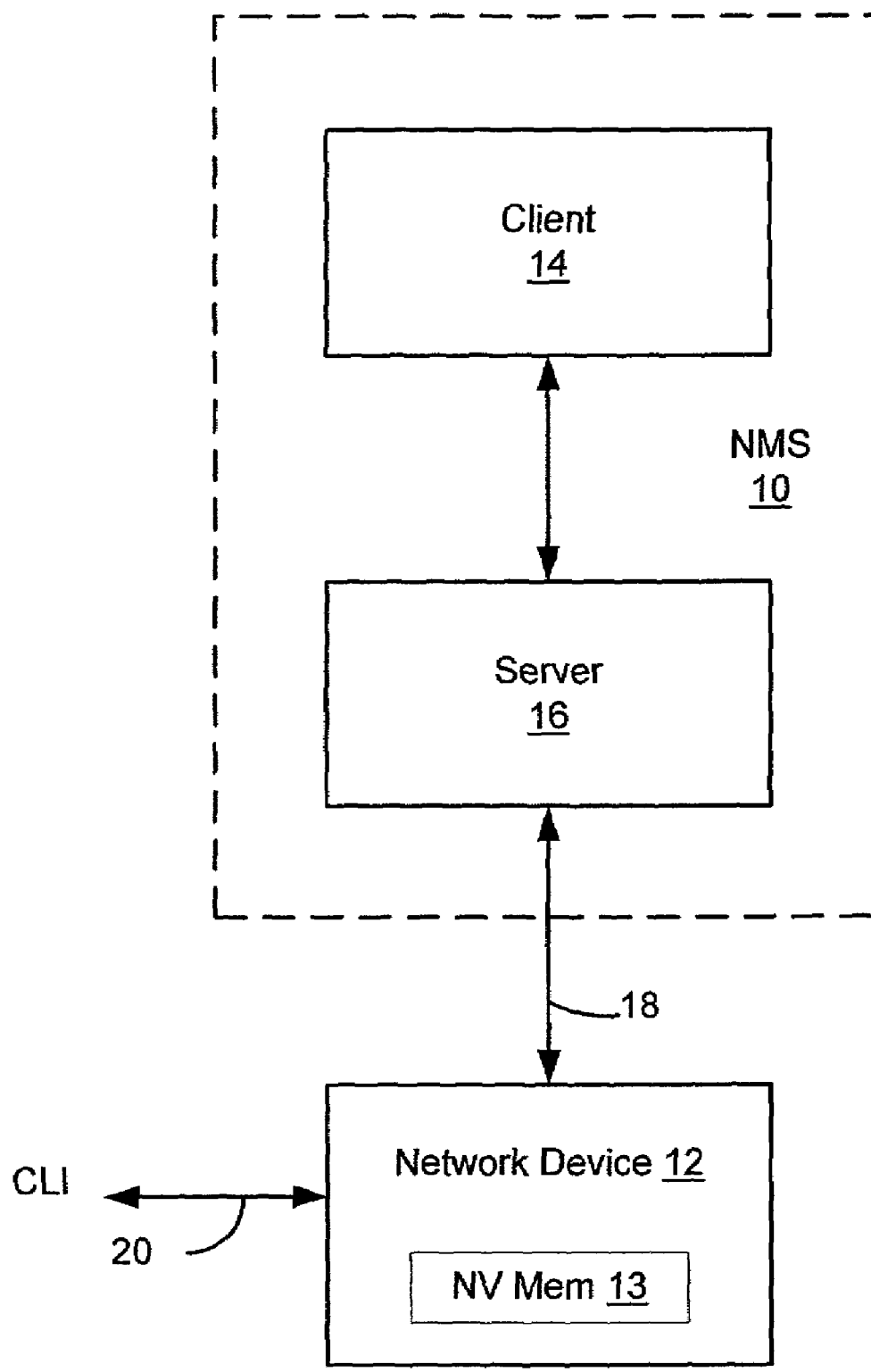
FIG. 1 is a block diagram of a network including a managed network device and a network management system in accordance with the present invention.

In FIG. 1, a network management system (NMS) 10 is communicatively coupled to a managed network device 12. The NMS 10 is organized according to a client-server model. Part of the NMS functionality resides on one or more clients 14, and part resides on one or more servers 16. The network device 12 is connected to one or more of the servers 16 of the NMS 10. Generally, the clients 14 and servers 16 reside on separate physical computer systems, although in some cases a client and server may reside on the same physical computer system.

The network device 12 is a device such as a switch, router, or similar apparatus that provides communications functionality for user data traffic in a network (not shown in FIG. 1). The network device 12 responds to commands from the NMS 10 via a connection 18 for various purposes pertaining to operation of the network device 12. For example, the network device 12 can be configured with various operational parameters and information by the NMS 10 via the connection 18. In one embodiment, for example, the network device 12 is a complex router device incorporating a number of "virtual routers" to provide virtual private routed network (VPRN) services to sets of network users, and each virtual router requires a variety of configuration information, including connection information, address information, and forwarding information. The information, and indeed the virtual routers themselves, are created, modified, and deleted in the network device 12 as a result of commands received from the NMS 10. In general, the connection 18 may be of the same type as other connections (not shown) of the device 12 on which user data traffic is carried, although the connection 18 carries network management traffic as opposed to user data traffic.

In addition to the interface to the NMS 10 via the connection 18, the network device 12 also provides a command line interface (CLI) via a separate connection 20, which may be for example a dial-up connection such as TELNET. This second connection 20 enables direct access to the network device 12 for certain purposes when it is necessary or desirable to bypass the NMS 10. Such purposes can include, for example, remotely initiated diagnostic testing of the network device 12, especially if the connection 18 to the NMS 10 is not working. Alternatively, the CLI at the connection 20 may provide access or control functions not available in the NMS 10, such as access to or control of low-level hardware elements or functions. Such dial-up interfaces on network devices are generally known to those skilled in the art.

The network device 12 maintains its configuration information in local non-volatile storage 13, such as flash-programmable memory. By doing so, the network device 12 is able to restore a running configuration after a power loss or similar interruption in operation. The NMS 10 also maintains configuration information for the network device 12. This copy of the configuration information is stored in a database at the server 16, and is used by the NMS 10 in managing the network device 12.

Figure 2:
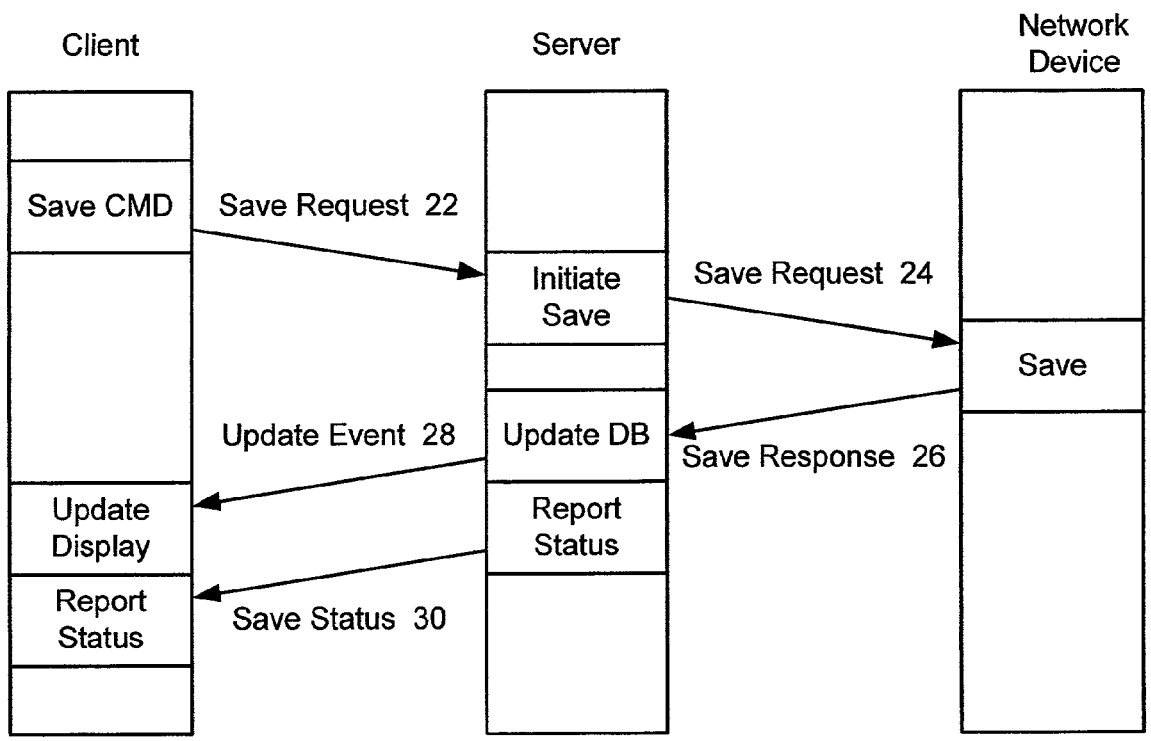
FIG. 2 is a signaling diagram showing a sequence of operations and signaling messages during an operation of saving network device configuration information in the network of FIG. 1.

FIG. 2 illustrates a process by which the NMS 10 instructs the network device 12 to save its current configuration in nonvolatile storage 13. The process originates at the client 14. A user invokes a SAVE command, for example by pressing a control button or selecting an item on a drop-down menu of a graphical user interface. As a result, a SAVE request message 22 is sent from the client 14 to the server 16, which responds by sending a SAVE request message 24 to the network device 12 and awaiting a response. The device 12 stores its configuration information into its local nonvolatile storage 13, and upon completion returns a SAVE response 26 to the server. The SAVE response 26 indicates whether the SAVE operation was successful. Normally, a successful completion is indicated. In the event of certain hardware failures or other failure conditions, an indication of failure is returned in the SAVE response 26.

Upon receiving a successful SAVE response 26 from the device 12, the server 16 updates a "last saved time" attribute for the device 12 in the NMS database. Additionally, an UPDATE event 28 is generated and sent to all clients 14 in the system. The UPDATE event 28 provides the updated "last saved time" attribute for the device 12 to the clients 14, which use this information to update records associated with the device 12 for display purposes. In particular, the "last saved time" and other attributes may be listed on a tabbed pane, pop-up pane, or similar display item associated with the device 12 in the graphical user interfaces of the clients 14. Although not shown in FIG. 2, it may be useful to employ an "event manager" in the NMS 10 to receive and distribute events such as UPDATE events. As is generally known in the art, event managers are specialized software sub-systems useful in distributed applications such as the client-server NMS 10.

In addition to updating the NMS database and generating the UPDATE event 28, the server 16 generates a SAVE status report 30 to report the status of the SAVE operation to the specific client 14 that initiated the SAVE. The SAVE status report 30 can be used in a variety of ways. For example, the client 14 may allow for only one SAVE to be pending at a time, by disabling SAVEs during the period between sending a SAVE request 22 and receiving the corresponding SAVE status report 30. The SAVE status report 30 can also be used to provide an announcement to the user, such as an error announcement alerting the user to potential problems in the system if an unsuccessful status report is received.

The SAVE process results in the saving of the configuration information at the network device 12. As previously mentioned, the NMS 10 also maintains configuration information for the device 12. While it is beneficial for operational purposes that the NMS 10 and the network device 12 maintain separate copies of the configuration information for the device 12, there is a potential hazard that must be addressed. The configuration information stored in the NMS 10 can become outdated, and therefore inaccurate, when configuration changes are made to the device 12 via the CLI connection 20. In such a case, the NMS 10 and device 12 are said to be "unsynchronized", because the configuration information in the NMS 10 does not reflect the actual configuration of the device 12. When such an unsynchronized condition exists, the ability of the NMS 10 to correctly manage the device 12 may be impaired. As an example, the NMS 10 may attempt to configure a new virtual router, based on configuration information indicating that the resources needed for a new virtual router are still available at the device 12. However, if configuration changes made to the device 12 via the CLI connection 20 have resulted in the allocation of some or all of the necessary resources to other uses, the device 12 may be unable to create a new virtual router or may do so in an incorrect fashion. Such a situation is preferably avoided.

Figure 3:
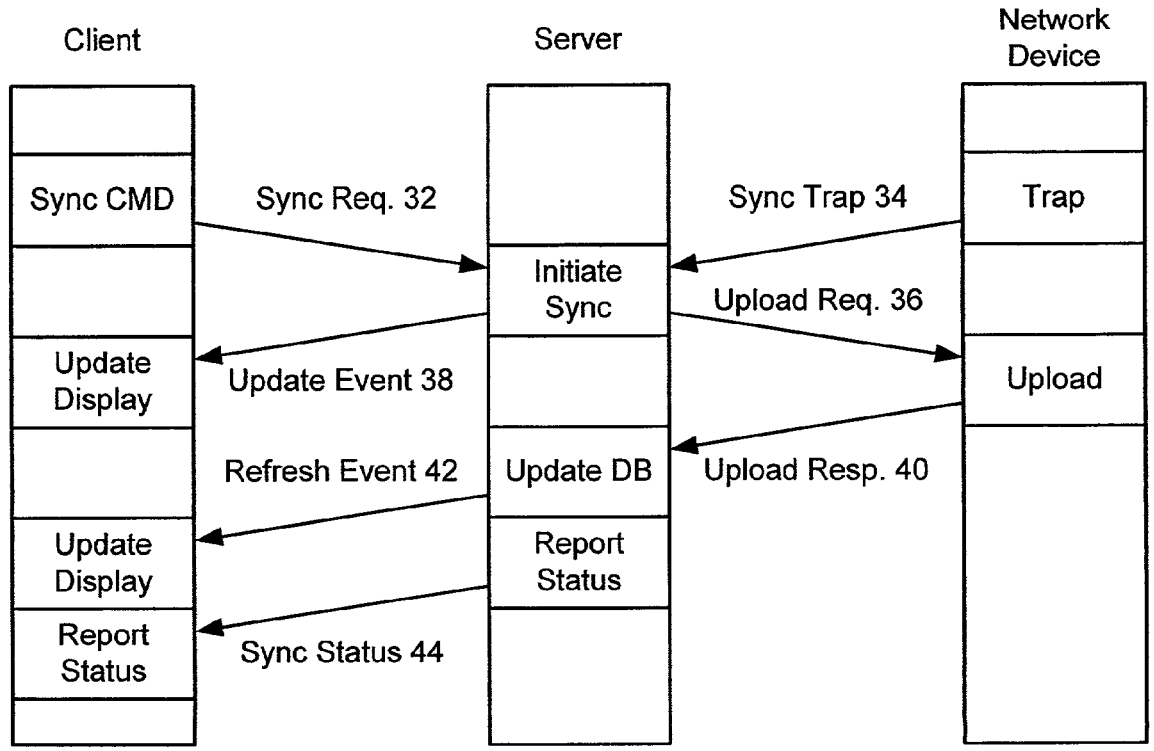
FIG. 3 is a signaling diagram showing a sequence of operations and signaling messages during an operation of updating network device configuration information in the network management system of FIG. 1.

FIG. 3 shows a process by which the configuration information in the NMS 10 is "synchronized", or made coherent with, the configuration information stored at the network device 12, to reduce the risks associated with unsynchronized operation. The synchronization process can be initiated by execution of a SYNC command at the client 14, for example by a user's pressing a control button or selecting an item on a drop-down menu of a graphical user interface. In response, the client 14 sends a SYNC request 32 to the server 16. Synchronization can also be initiated by the device 12 via a "trap" mechanism that results in the sending of a SYNC trap message 34 to the server 16. The trap preferably occurs at least upon power-up of the device 12, and may also occur under other conditions as desired, such as upon insertion or removal of a circuit card or similar hardware event. The power-up trap ensures that the configuration information in the NMS 10 is synchronized to the configuration information in the device 12 at least at the start of an operational period, so that any changes that previously may have been made via the CLI connection 20 are reflected in the database of the NMS 10.

Upon receiving either the SYNC request 32 or the SYNC trap 34, the server 16 initiates the synchronization operation by sending an UPLOAD request 36 to the network device 12. This message instructs the network device 12 to send its configuration information to the server 16. The server 16 also generates an UPDATE event 38 indicating that a synchronization operation is in progress. Each client 14 receiving the UPDATE event 38 can respond by updating its display in some manner, such as by changing a visual attribute of an icon representing the device 12 or displaying a text message such as "synchronization in progress".

The device 12 responds to the UPLOAD request 36 by sending an UPLOAD response 40 including a file containing the device's running configuration information. A file transfer protocol such as FTP may be used. The file may be formatted in any of a variety of convenient formats. In one embodiment, the file uses Extensible Markup Language (XML) and has a format defined by a custom Document Type Definition (DTD), an example of which is reproduced below. By using a flexible format such as XML, the network device 12 may be upgraded independently of the NMS 10, as long as the XML browser employed in the NMS 10 can interpret new XML files based on new DTDs that may be used in connection with the upgrade.

Upon receiving the uploaded configuration file included in the UPLOAD response 40 from the device 12, the server 16 updates the corresponding information in the network management database. That is, each record in the uploaded configuration file is copied to a counterpart location in the database, overwriting the previous database contents. Upon completion of this updating, the NMS database becomes synchronized with the configuration information in the network device 12. The server 16 generates a REFRESH event 42 informing the clients 14 that the device information in the database has changed. The clients 14 respond to the REFRESH event by updating the portion of the display pertaining to the device 12. Such updating might include, for example, re-writing a list of virtual routers configured in the device 12, or other displayed information.

In addition to generating the REFRESH event 42, the server 16 sends a SYNC status report 44 to the client 14 that initiated the synchronization, when the synchronization process was initiated by a client 14 rather than by the device 12. The client 14 can use this report for various purposes, such as displaying notifications to the user and re-enabling the synchronization control button to permit subsequent initiation of another synchronization.

It should be noted that in the process of FIG. 3, synchronization is initiated only in response to either an explicit SYNC command executed at the client 14 or a trap from the network device 12. In alternative embodiments, it may be beneficial for the NMS 10 to poll the device 12 in addition to or in place of these initiation methods. That is, the NMS 10 could periodically query the device 12 to determine whether any configuration changes have occurred, and if so then initiate the synchronization process. Such polling may further reduce the risk of unsynchronized operation, albeit at the cost of additional processing and network traffic associated with the polling.

For illustrative purposes, an exemplary DTD for an XML-based configuration information file is shown below. This DTD is specific to a device 12 of the type described above, i.e. a complex router that can be configured with multiple virtual routers. For this type of device, the configuration information includes lists of such things as the slots and ports of the device, supported virtual LANs (VLANs), MPLS tunnels over which virtual routers communicate with other virtual routers in the network, and information pertaining to supported routing protocols such as OSPF and RIP. It will be appreciated that the elements defined in a DTD will vary considerably depending on the nature of the network device 12.

```
<?xml version="1.0" encoding="UTF-8"?>
<!DOCTYPE device-config [
<!ELEMENT device-config (chassis, vlan-list?, virtual-management-
router?, virtual-backbone-router?, tunnel-list?, virtual-router-
list?) >
<!ELEMENT chassis (slot-list, chassis-general?) >
<!ELEMENT slot-list (slot*) >
<!ELEMENT slot (var-list, portmapping-list) >
<!ELEMENT portmapping-list (port*) >
<!ELEMENT port (var-list) >
<!ELEMENT chassis-general (var-list) >
<!ELEMENT vlan-list (vlan*) >
<!ELEMENT vlan (var-list) >
<!ELEMENT virtual-management-router (var-list, virtual-router-
```

-continued

```
interface-list?, protocol-list?, ip-cidr-route-list?) >
<!ELEMENT virtual-backbone-router (var-list, virtual-router-
interface-list, protocol-list?, ip-cidr-route-list?) >
<!ELEMENT tunnel-list (tunnel*, tunnel-resource-list?, tunnel-
hops-list?, tunnel-arhops-list?) >
<!ELEMENT tunnel (static-tunnel|signal-tunnel) >
<!ELEMENT static-tunnel (ingress-tunnel, egress-tunnel) >
<!ELEMENT ingress-tunnel (in-segment, cross-connect, mpls-tunnel)>
<!ELEMENT in-segment (var-list) >
<!ELEMENT cross-connect (var-list) >
<!ELEMENT mpls-tunnel (var-list) >
<!ELEMENT egress-tunnel (out-segment, cross-connect, mpls-tunnel)
>
<!ELEMENT out-segment (var-list) >
<!ELEMENT signal-tunnel (mpls-tunnel) >
<!ELEMENT tunnel-resource-list (tunnel-resource*) >
<!ELEMENT tunnel-hops-list (tunnel-hops*) >
<!ELEMENT tunnel-arhops-list (tunnel-arhops*) >
<!ELEMENT tunnel-resource (var-list) >
<!ELEMENT tunnel-hops (var-list) >
<!ELEMENT tunnel-arhops (var-list) >
<!ELEMENT virtual-router-list (virtual-router*) >
<!ELEMENT virtual-router (var-list, virtual-router-interface-list,
protocol-list, ip-cidr-route-list?) >
<!ELEMENT virtual-router-interface-list (virtual-router-
interface*) >
<!ELEMENT virtual-router-interface (var-list) >
<!ELEMENT protocol-list (ospf?|rip?) >
<!ELEMENT ospf (ospf-general, ospf-interface-list) >
<!ELEMENT ospf-general (var-list) >
<!ELEMENT ospf-interface-list (ospf-interface) >
<!ELEMENT ospf-interface (ospf-area, ospf-interface-entry) >
<!ELEMENT ospf-area (var-list) >
<!ELEMENT ospf-interface-entry (var-list) >
<!ELEMENT ripv2 (ripv2-interface-list?) >
<!ELEMENT ripv2-interface-list (rip2-interface*) >
<!ELEMENT ripv2-interface (var-list) >
<!ELEMENT ip-cidr-route-list ( ip-cidr-route) >
<!ELEMENT ip-cidr-route (var-list) >
<!ELEMENT var-list (var+)>
<!ELEMENT var EMPTY>
<!ATTLIST device-config
    version CDATA #REQUIRED
    deviceid CDATA #REQUIRED
>
<!ATTLIST slot index CDATA #REQUIRED >
<!ATTLIST port index CDATA #REQUIRED >
<!ATTLIST ip-cidr-route index CDATA #REQUIRED >
<!ATTLIST vlan index CDATA #REQUIRED
>
<!ATTLIST virtual-management-router index CDATA #REQUIRED >
<!ATTLIST virtual-backbone-router index CDATA #REQUIRED >
<!ATTLIST virtual-router index CDATA #REQUIRED >
<!ATTLIST ingress-tunnel
    index CDATA #REQUIRED
    src CDATA #REQUIRED
    dst CDATA #REQUIRED
>
<!ATTLIST egress-tunnel
    index CDATA #REQUIRED
    src CDATA #REQUIRED
    dst CDATA #REQUIRED
>
<!ATTLIST var
    oid CDATA #REQUIRED
    type (int32|string|ipaddr)
    value CDATA #REQUIRED
>
]>
```

It will be apparent to those skilled in the art that modifications to and variations of the disclosed methods and apparatus are possible without departing from the inventive concepts disclosed herein, and therefore the invention should not be viewed as limited except to the full scope and spirit of the appended claims.

What is claimed is:

1. A method of managing configuration information of a network device of a network having a plurality of devices, comprising:

at the network device, (1) maintaining running configuration information of the network device, where the configuration information includes how the devices are connected to each other, the capacities and relative utilization of communication links of the network among the devices and faults and problems on the network, (2) changing the running configuration information in response to (i) configuration change requests received from a network management system at a first interface and (ii) configuration change requests received from outside the network management system at a second interface, and (3) in response to receiving an upload configuration request from the network management system, transferring a configuration file containing the running configuration information to the network management system; and at the network management system, (1) maintaining a database including configuration information for the network device, the configuration information potentially being outdated due to the configuration change requests received by the network device at the second interface, and (2) under predetermined conditions, (i) sending an upload configuration request to the network device and subsequently receiving the configuration file from the network device, and (ii) updating the configuration information in the database using the contents of the configuration file.

2. A method according to claim 1, wherein the second interface includes a command line software interface.

3. A method according to claim 2, wherein the second interface includes a dial-up connection.

4. A method according to claim 1, wherein the configuration file has an extensible format.

5. A method according to claim 4, wherein the format of the configuration file employs extensible markup language.

6. A method according to claim 1, wherein the network management system includes a network management client communicatively coupled to a network management server.

7. A method according to claim 1, wherein the network management system includes a network management client communicatively coupled to a network management server, and wherein the sending of the upload configuration request and the updating of the information in the database occur at the network management server in response to the receipt of a synchronization request from the network management client.

8. A method according to claim 7, further comprising sending an update event from the network management server to the network management client in response to the receipt of the synchronization request, and responding to the update event at the network management client by updating a user display to indicate that a synchronization operation with respect to the network device is in progress.

9. A method according to claim 7, further comprising sending a refresh event from the network management server to the network management client upon updating the information in the database, and responding to the refresh event at the network management client by updating a user display with updated configuration information for the network device.

10. A method according to claim 7, further comprising sending a status report from the network management server to the network management client upon receiving the configuration file from the network device and updating the information in the database, the status report indicating to the network management client that the synchronization request has been successfully carried out.

11. A method according to claim 7, wherein the network management client includes a graphical user interface, and wherein the synchronization request is sent from the network management client to the network management server in response to a user's activation of a control object on the graphical user interface.

12. A method according to claim 11, wherein the control object comprises a push button.

13. A method according to claim 11, wherein the control object comprises a selectable menu item.

14. A method according to claim 7, wherein the sending of the upload configuration request and the updating of the information in the database also occur at the network management server in response to the receipt of a trap message from the network device.

15. A method according to claim 14, wherein the trap message is sent upon power-up of the network device.

16. A method according to claim 1, wherein the network device includes functional features for supporting virtual routed networks, and wherein the configuration information includes information pertaining to at least one specific virtual routed network supported by the network device.

17. A method according to claim 1, wherein the sending of the upload configuration request and the updating of the information in the database occur in response to the receipt by the network management system of a message from the network device.

18. A method according to claim 17, wherein the message from the network device comprises a trap message.

19. A method according to claim 1, further comprising:
at the network device, saving the running configuration information in response to save requests received from the network management system; and
at the network management system, under predetermined conditions, sending a save request to the network device.

20. A network having a plurality of devices, comprising:
a network device being operative (1) to maintain running configuration information of the network device, where the configuration information includes how the devices are connected to each other, the capacities and relative utilization of communication links of the network among the devices and faults and problems on the network, (2) to change the running configuration information in response to (i) configuration change requests received at a first interface and (ii) configuration change requests received at a second interface, and (3) in response to receiving an upload configuration request at the first interface, to transfer a configuration file containing the running configuration information to the source of the request via the first interface; and
a network management system coupled to the network device via the first interface, the network management system being operative (1) to maintain a database including configuration information for the network device, the configuration information potentially being outdated due to the configuration change requests received by the network device at the second interface, and (2) under predetermined conditions, (i) to send an upload configuration request to the network device and to subsequently receive the configuration file from the network device, and (ii) to update the configuration information in the database using the contents of the configuration file.

21. A network according to claim 20, wherein the network device provides a command line software interface at the second interface.

22. A network according to claim 21, wherein the second interface includes a dial-up connection.

23. A network according to claim 20, wherein the configuration file has an extensible format.

24. A network according to claim 23, wherein the format of the configuration file employs extensible markup language.

25. A network according to claim 20, wherein the network management system includes a network management client communicatively coupled to a network management server.

26. A network according to claim 20, wherein the network management system includes a network management client communicatively coupled to a network management server, and wherein the sending of the upload configuration request and the updating of the information in the database occur at the network management server in response to the receipt of a synchronization request from the network management client.

27. A network according to claim 26, wherein the network management server is further operative to send an update event to the network management client in response to the receipt of the synchronization request, and wherein the network management client is further operative to respond to the update event by updating a user display to indicate that a synchronization operation with respect to the network device is in progress.

28. A network according to claim 26, wherein the network management server is further operative to send a refresh event to the network management client upon updating the information in the database, and wherein the network management client is further operative to respond to the refresh event by updating a user display with updated configuration information for the network device.

29. A network according to claim 26, wherein the network management server is further operative to send a status report to the network management client upon receiving the configuration file from the network device and updating the information in the database, the status report indicating to the network management client that the synchronization request has been successfully carried out.

30. A network according to claim 26, wherein the network management client includes a graphical user interface, and wherein the synchronization request is sent from the network management client to the network management server in response to a user's activation of a control object on the graphical user interface.

31. A network according to claim 30, wherein the control object comprises a push button.

32. A network according to claim 30, wherein the control object comprises a selectable menu item.

33. A network according to claim 26, wherein the network management server is further operative to send the upload configuration request and to update the information in the database in response to the receipt of a trap message from the network device.

34. A network according to claim 33, wherein the trap message is sent upon power-up of the network device.

35. A network according to claim 20, wherein the network device includes functional features for supporting virtual routed networks, and wherein the configuration information includes information pertaining to at least one specific virtual routed network supported by the network device.

36. A network according to claim 20, wherein the network management system is further operative to send the upload configuration request and to update the information in the database in response to the receipt of a message from the network device.

37. A network according to claim 36, wherein the message from the network device comprises a trap message.

38. A network according to claim 20, wherein:
the network device is further operative to save the running configuration information in response to save requests received from the network management system; and
the network management system is further operative to send a save request to the network device under predetermined conditions.

* * * * *